United States Patent
Nasir et al.

(10) Patent No.: US 9,426,721 B2
(45) Date of Patent: Aug. 23, 2016

(54) TEMPORARY ACCESS TO WIRELESS NETWORKS

(71) Applicant: Verizon Patent and Licensing Inc., Arlington, VA (US)

(72) Inventors: Azim Nasir, Foxboro, MA (US); Andre R. Turner, Belmont, MA (US); Hong Xiao, Acton, MA (US); Dongchen Wang, Concord, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 184 days.

(21) Appl. No.: 14/140,364

(22) Filed: Dec. 24, 2013

(65) Prior Publication Data

US 2015/0181503 A1 Jun. 25, 2015

(51) Int. Cl.
*H04W 48/02* (2009.01)

(52) U.S. Cl.
CPC .................................. *H04W 48/02* (2013.01)

(58) Field of Classification Search
CPC .................................................... H04W 48/02
USPC ......................................................... 455/411
See application file for complete search history.

(56) References Cited

U.S. PATENT DOCUMENTS

| | | | | |
|---|---|---|---|---|
| 7,239,862 B1* | 7/2007 | Clare | .................... | H04M 15/00 379/114.03 |
| 2004/0077334 A1* | 4/2004 | Joyce | .................... | G06Q 20/00 455/406 |
| 2005/0097046 A1* | 5/2005 | Singfield | .............. | G06Q 20/042 705/42 |
| 2006/0141994 A1* | 6/2006 | Fratti | .................. | H04M 3/2218 455/414.1 |
| 2009/0010408 A1* | 1/2009 | Altberg | .................. | G06Q 10/10 379/114.01 |
| 2009/0138964 A1* | 5/2009 | Headings | ............... | G06Q 20/10 726/17 |
| 2011/0145149 A1* | 6/2011 | Valdes | .................... | G06Q 20/10 705/44 |
| 2013/0231080 A1* | 9/2013 | Cheuk | .................. | H04M 15/765 455/405 |
| 2014/0156396 A1* | 6/2014 | deKozan | ............ | G06Q 30/0261 705/14.53 |

* cited by examiner

*Primary Examiner* — Qun Shen

(57) ABSTRACT

A server device may receive a first request for temporary access to a wireless network, the first request being associated with a first device, wherein the temporary access is based on a subscription for access to the wireless network, the subscription being associated with a second device; grant the first request for temporary access to the wireless network; subsequently determine that the temporary access to the wireless network has expired; receive, after the temporary access has expired, a second request for temporary access to the wireless network, the second request being associated with the first device; and reject the second request for temporary access to the wireless network, the rejecting being based on determining that temporary access has previously been granted to the first device.

20 Claims, 8 Drawing Sheets

TEMPORARY ACCESS TO WIRELESS NETWORKS

BACKGROUND

Users of wireless networks, such as cellular telecommunications networks, may use devices (e.g., cellular telephones) to access wireless networks. Users often upgrade these devices, and may sometimes keep older, deactivated devices. These older devices often go unused once deactivated. Furthermore, users' subscriptions often have unused usage (e.g., unused data, voice call minutes, or the like).

DETAILED DESCRIPTION OF PREFERRED EMBODIMENTS

The following detailed description refers to the accompanying drawings. The same reference numbers in different drawings may identify the same or similar elements.

Techniques described herein may allow for the granting of temporary access to wireless networks (e.g., cellular telecommunications networks). For example, a user device (referred to herein as a "master device") may be associated with a subscription (e.g., an annual subscription, a multi-year subscription, a month-to-month subscription, etc.) for access to a wireless network. Another device (referred to herein as a "sub-account device") may receive temporary access to the wireless network, based on the subscription associated with the master device. For example, the sub-account device may be granted a portion of the usage (e.g., voice call usage, data usage, etc.) allotted for the master device, under the subscription associated with the master device. The sub-account device may be, for example, an old device that is no longer associated with a subscription for service, a device used by an out-of-town visitor, or the like.

Figure 1A:
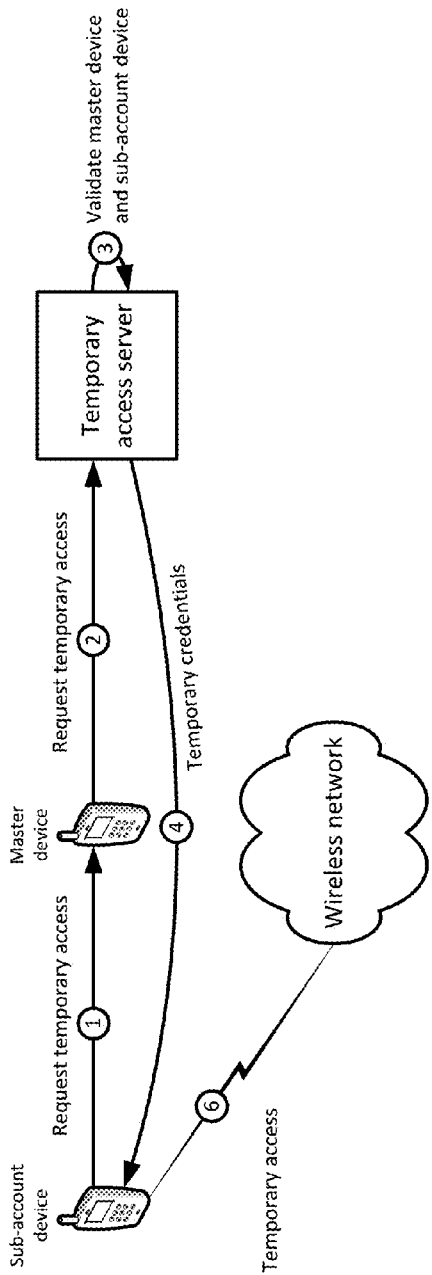
FIGS. 1A and 1B illustrate an example overview of one or more implementations described herein.

For instance, as shown in FIG. 1A, a sub-account device may request (at the arrow marked "1") temporary access from a master device. A user of the master device may determine whether to allow the temporary access, and/or may determine parameters associated with the temporary access (e.g., an amount of voice call time or data, etc.). The request for temporary access may be forwarded (at the arrow marked "2") to a temporary access server.

The temporary access server may validate (at the arrow marked "3") the request for temporary access. For example, the temporary access server may determine whether the sub-account device and/or the master device have previously obtained temporary access, and/or to what extent the sub-account device and/or the master device have previously obtained temporary access. The temporary access server may, in some situations, deny the requested access when the sub-account device and/or the master device have requested excessive temporary access. These situations may occur when a user of the sub-account device or the master device is attempting to subvert standard subscription procedures, by repeatedly obtaining temporary access.

Once the request for temporary access is granted, the temporary access server may provide (at the arrow marked "4") temporary credentials to the sub-account device. The temporary credentials may include, for instance, a telephone number, and/or other information that the sub-account device may use to access the wireless network. Additionally, when the request for temporary access is granted, the temporary access server may notify (not shown) the sub-account device, the master device, and/or the wireless network that the temporary access has been granted. The sub-account device may use the temporary credentials to access (at the connection marked "6") the wireless network. For example, the sub-account device may place and/or receive phone calls via the wireless network, send and/or receive data, etc., using the temporary credentials.

Figure 1B:
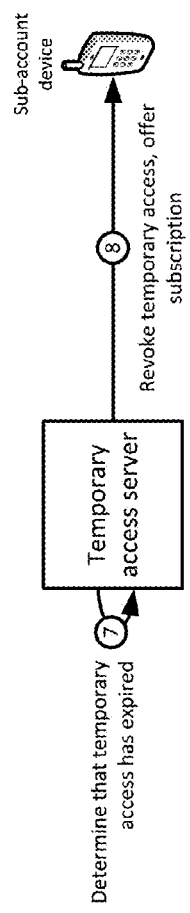

As mentioned above, the temporary access may correspond to an amount of usage (e.g., voice call minutes and/or an amount of data, etc.). As shown in FIG. 1B, the temporary access server may determine (at the arrow marked "7") that the temporary access has expired. Based on determining that the temporary access has expired, the temporary access server may revoke (at the arrow marked "8") the temporary access. For example, the temporary access server may notify the sub-account device, the master device, and/or the wireless network that the temporary access has been revoked. Once the temporary access has been revoked, the sub-account device may no longer be able to access the wireless network.

As further shown, the temporary access server may also offer a subscription to the sub-account device when the temporary access has expired. For example, the temporary access server may offer a one-year, multi-year, or month-to-month subscription to the sub-account device. The offered subscription may allow the sub-account device to be used without being tied to the subscription of the master device.

Allowing temporary access to sub-account devices may be beneficial to users who require temporary access, such as when traveling, without the necessity for the users to sign up for additional services that may be extraneous to the users' needs. Furthermore, limiting the amount of temporary access may tend to prevent users from using the temporary access to avoid signing up for more conventional subscriptions. Additionally, offering conventional subscriptions to sub-account devices may allow a wireless service provider to monetize the sub-account devices, this generating additional revenue through additional subscriptions.

Figure 2:
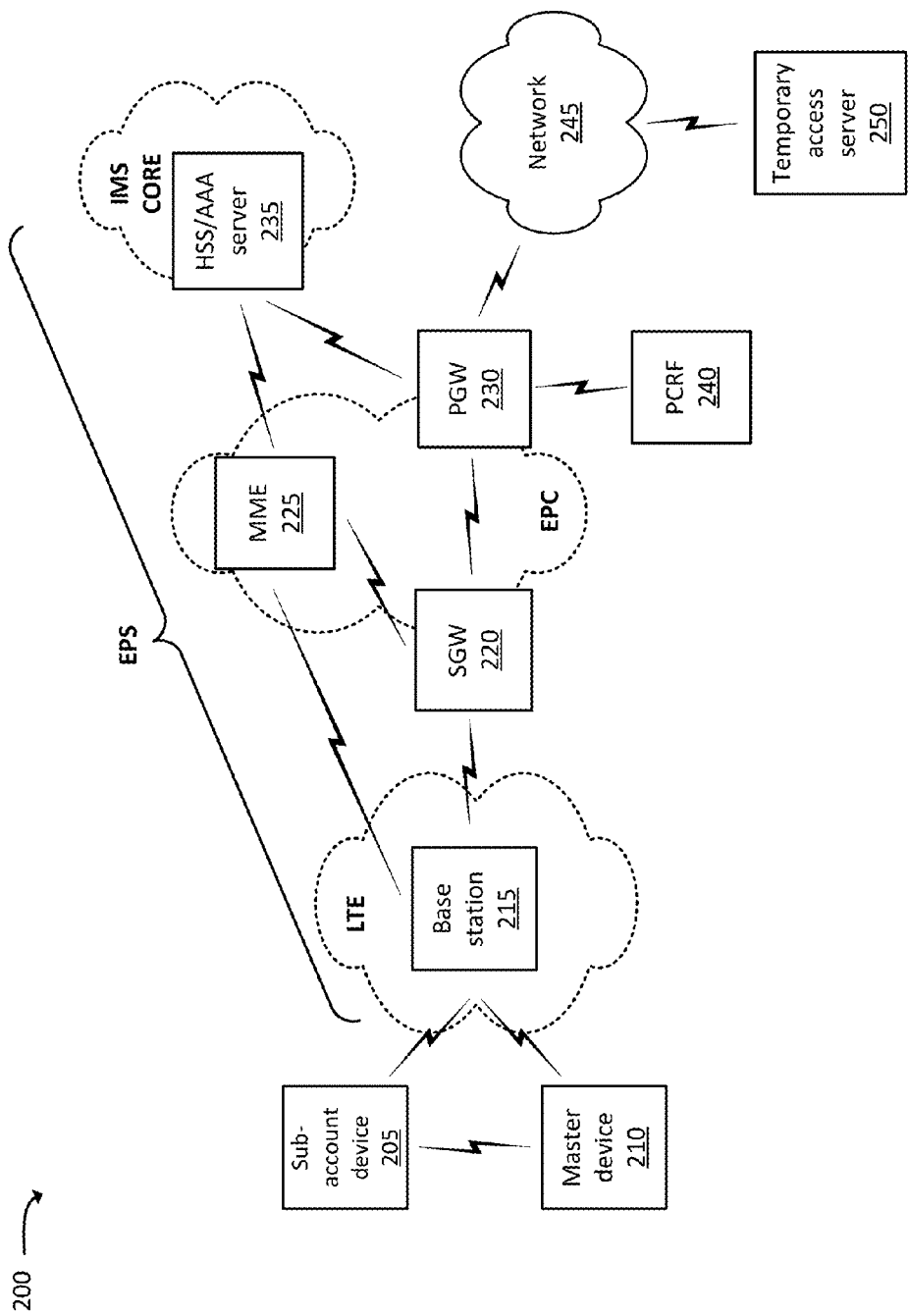
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include sub-account device 205, master device 210, base station 215, serving gateway ("SGW") 220, mobility management entity device ("MME") 225, packet data network ("PDN") gateway ("PGW") 230, home subscriber server ("HSS")/authentication, authorization, accounting ("AAA") server (hereinafter referred to as "HSS/AAA server") 235, policy charging and rules function ("PCRF") 240, network 245, and temporary access server 250.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 215, some or all of which may take the form of an eNodeB ("eNB"), via which sub-account device 205 and/or master device 210 may communicate with the EPC network. The EPC network may include one or more SGWs 220, MMEs 225, and/or PGWs 230, and may enable sub-account device 205 and/or master device 210 to communicate with network 245 and/or an Internet protocol ("IP") multimedia subsystem ("IMS") core network. The IMS core network may include HSS/AAA server 235, and may manage authentication, session initiation, account information, a user profile, etc. associated with sub-account device 205 and/or master device 210.

Sub-account device 205 may include any computation and communication device, such as a wireless mobile communication device that is capable of communicating with one or more networks (e.g., network 245 and/or the IMS core). For example, sub-account device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, and/or another type of mobile computation and communication device.

Master device 210 may also include any computation and communication device, such as a wireless mobile communication device that is capable of communicating with one or more networks (e.g., network 245 and/or the IMS core). For example, sub-account device 205 may include a radiotelephone; a PCS terminal; a PDA; a smart phone; a laptop computer; a tablet computer; a camera; an STD, a personal gaming system, and/or another type of mobile computation and communication device.

Master device 210 and sub-account device 205 may be capable of communicating, such as through a wireless interface. For example, master device 210 and sub-account device 205 may communicate via Bluetooth®, Wi-Fi, Near Field Protocol ("NFC"), and/or another communication technique. In some implementations, master device 210 and sub-account device 205 may communicate via network 245.

Base station 215 may include one or more network devices that receive, process, and/or transmit traffic, such as calls, audio, video, text, television programming content, and/or other data, destined for and/or received from sub-account device 205 and/or master device 210. In one example, base station 215 may be an eNB device and may be part of the LTE network. Base station 215 may receive traffic from and/or send traffic to network 245 via SGW 220 and PGW 230. Base station 215 may send traffic to and/or receive traffic from sub-account device 205 and/or master device 210 via an air interface.

SGW 220 may include one or more network devices that gather, process, search, store, and/or provide information. For example, SGW 220 may include a gateway, a router, a modem, a switch, a firewall, a network interface card ("NIC"), a hub, a bridge, a proxy server, or some other type of device that processes and/or transfers traffic. SGW 220 may, for example, aggregate traffic received from one or more base stations 215 and may send the aggregated traffic to network 245 and/or another network via PGW 230. SGW 220 may also aggregate traffic received from network 245 and/or another network (e.g., via PGW 230) and may send the aggregated traffic to sub-account device 205 and/or master device 210 via one or more base stations 215.

MME 225 may include one or more computation and communication devices that gather, process, search, store, and/or provide information. For example, MME 225 may perform operations to register sub-account device 205 and/or master device 210 with the EPS, to establish bearer channels associated with a session with sub-account device 205 and/or master device 210, to hand off sub-account device 205 and/or master device 210 from the EPS to another network, to hand off sub-account device 205 and/or master device 210 from the other network to the EPS, and/or to perform other operations. MME 225 may perform policing operations on traffic destined for and/or received from sub-account device 205 and/or master device 210.

PGW 230 may include one or more network devices, or other types of computation and communication devices, that gather, process, search, store, and/or provide information in a manner described herein. For example, PGW 230 may include a gateway, a router, a modem, a switch, a firewall, a NIC, a hub, a bridge, a proxy server, an optical add-drop multiplexer ("OADM"), and/or some other type of device that processes and/or transfers traffic. PGW 230 may aggregate traffic received from one or more SGWs 220, and may send the aggregated traffic to network 245. PGW 230 may also, or alternatively, receive traffic from network 245 and may send the traffic toward sub-account device 205 and/or master device 210 via SGW 220, and/or base station 215.

HSS/AAA server 235 may include one or more server devices, or other types of devices, that gather, process, search, store, and/or provide information. For example, HSS/AAA server 235 may manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with sub-account device 205 and/or master device 210 and/or one or more other user devices. Additionally, or alternatively, HSS/AAA server 235 may perform authentication, authorization, and/or accounting operations associated with the subscriber and/or a communication session with sub-account device 205 and/or master device 210.

PCRF 240 may include one or more server devices, or other types of devices, that aggregate information to and from the EPC network and/or other sources. PCRF 240 may receive information regarding policies and/or subscriptions from one or more sources, such as subscriber databases and/or from one or more users (such as, for example, an administrator associated with PCRF 240).

Network 245 may include one or more wired and/or wireless networks. For example, network 245 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 245 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 245 may be provided by one or more cellular network providers. That is, in some such implementations, network devices within, or associated with, network 245, may be provided by the one or more cellular network providers. In some implementations, network 245 may be communicatively coupled to one or more other networks, such as the Internet.

Temporary access server 250 may include one or more server devices that perform functions related to granting temporary access to a wireless network (e.g., temporary access to the EPS, to portions of the EPS, and/or to another wireless network). As described herein, temporary access server 250 may store information regarding sub-account device 205 and/or master device 210, and may process requests for temporary access to the wireless network based on the stored information. Temporary access server 250 may communicate with sub-account device 205 and/or master device 210 via, for example, network 245. Temporary access server 250 may also, or alternatively, communicate with one or more devices of the wireless network, such as HSS/AAA server 235, via a wired or wireless connection.

Figure 3:
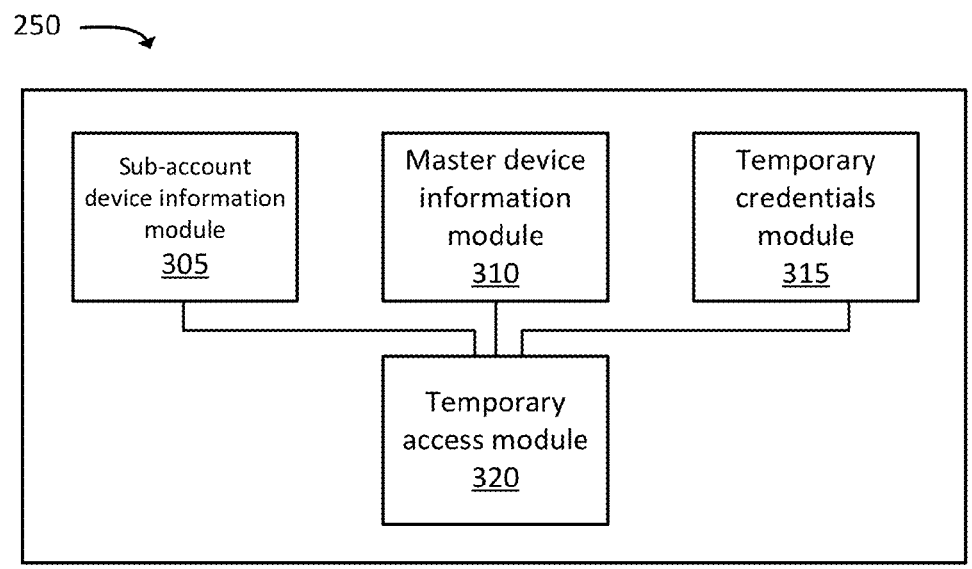
FIG. 3 illustrates example components of a temporary access server, according to some implementations.

FIG. 3 illustrates example functional components of temporary access server 250, according to one or more implementations. Temporary access server 250 may include, for example, sub-account device information module 305, master device information module 310, temporary credentials module 315, and temporary access module 320. In other implementations, temporary access server 250 may include additional, fewer, different, and/or differently arranged devices. Furthermore, the functionality of one component may be performed by multiple components, and/or the functionality of multiple components may be performed by one component.

Sub-account device information module 305 may receive and/or store information regarding sub-account devices. The information stored by sub-account device information module 305 may be used to track devices that have been used as sub-account devices, and to what extent such devices have been used as sub-account devices. For example, the sub-account device information may include a device identifier, such as an International Mobile Equipment Identity ("IMEI"), media access control ("MAC") identifier, an International Mobile Subscriber Identity ("IMSI"), and/or another device identifier. In some implementations, the sub-device information may include information identifying a user associated with a sub-account device. The user information may include for example, a first and/or last name of the user, an address, a telephone number, an email address, etc.

The sub-account device information may further include prior usage information, which may indicate the extent to which temporary access has been granted to sub-account devices. For example, the usage information may indicate a quantity of voice call minutes and/or an amount of data used by the sub-account devices, a length of time during which sub-account devices have received temporary access, a quantity of calls placed and/or received by sub-account devices, etc. As mentioned above, the usage information may be used to determine whether certain sub-account devices have received temporary access in the past, and to what extent. This usage information may be used, for example, to validate or invalidate requests for temporary access to a wireless network. Additionally, or alternatively, the usage information may be used to generate or identify offers for subscriptions to wireless networks (e.g., subscriptions that are based on usage patterns of the sub-account devices).

The sub-account device information, stored by sub-account device information module 305, may also include security information. The security information may include, for example, information that indicates whether certain sub-account devices have been reported lost or stolen. This security information may be used, for example, to validate or invalidate requests for temporary access to a wireless network.

Sub-account device information module 305 may receive sub-account device information from, for example, wireless networks that are accessed by sub-account devices, from sub-account devices, from an administrator associated with temporary access server 250, and/or from one or more other sources. For example, sub-account device information module 305 may receive usage information from a particular sub-account device and/or from a wireless network that is being temporarily accessed by the sub-account device. As another example, sub-account device information module 305 may receive security information from an owner of a particular sub-account device (e.g., a lost or stolen sub-account device). As yet another example, sub-account device information module 305 may receive information regarding a particular sub-account device when temporary access, for the sub-account device, is requested.

Master device information module 310 may store information regarding master devices (e.g., devices associated with subscriptions for wireless service, via which sub-account devices obtain temporary access). The information stored by master device information module 310 may also be used to determine whether to grant access to a sub-account device associated with a particular master device. For example, a master device that has been used to grant excessive temporary access to one or more sub-devices may be identified as a master device through which further temporary access should not be granted.

The master device information, stored by master device information module 310, may include a device identifier, such as an IMEI, MAC identifier, an IMSI, and/or another device identifier. In some implementations, the master device information may include information identifying a user associated with a master device. The user information may include for example, a first and/or last name of the user, an address, a telephone number, an email address, etc.

The master device information may further prior include usage information, which may indicate the extent to which temporary access has been granted to sub-account devices through particular master devices. For example, the usage information may indicate a quantity of voice call minutes and/or an amount of data used by the sub-account devices, a length of time during which sub-account devices have received temporary access, a quantity of calls placed and/or received by sub-account devices, etc. As mentioned above, the usage information may be used to determine whether certain master devices have been used to grant temporary access to sub-account devices in the past, and to what extent.

The master device information, stored by master device information module 310, may also include security information. The security information may include, for example, information that indicates whether certain master devices have been reported lost or stolen. This security information may be used, for example, to validate or invalidate requests for temporary access to a wireless network, via master devices.

The master device information may also include information regarding a subscription, to the wireless network, associated with a particular master device. For example, the master device may be associated with an annual contract, a multi-year contract, a month-to-month contract, a pay-as-you-go contract, and/or another type of contract with the wireless network. The contract may specify an amount of usage that is allowed to be used by the master device (e.g., a quantity of voice call minutes per month, an amount of data per month, a quantity of short message service ("SMS") messages per month, etc.). This information may be used to determine whether requests for temporary access are supported by a master device. For instance, if a request for temporary access, by a sub-account device, exceeds the amount of available usage associated with a corresponding master device, the request may be denied.

Master device information module 310 may receive master device information from, for example, wireless networks that are accessed by sub-account devices or master devices, from master devices, from an administrator associated with temporary access server 250, and/or from one or more other sources. For example, sub-account device information module 305 may receive usage information from a particular sub-account device, that is associated with the master device, and/or from a wireless network that is being temporarily accessed by the sub-account device. As another example, sub-account device information module 305 may receive security information from an owner of a particular master device (e.g., a lost or stolen master device). As yet another example, sub-account device information module 305 may receive information regarding a particular master device when temporary access for a sub-account device, via the master device, is requested.

Temporary credentials module 315 may include credentials that may be used to temporarily access a wireless network. Temporary credentials may include, for example, a telephone number, authentication credentials, or the like. In some implementations, temporary credentials module 315 may store a finite "pool" of credentials, such as a particular quantity of telephone numbers. The credentials may be received from, for example, a wireless network to which sub-account devices may be granted temporary access.

Temporary access module 320 may receive requests for temporary access to wireless networks by sub-account devices, and may determine whether to grant the requests. For example, temporary access module 320 may receive a request for temporary access to a wireless network, by a particular sub-account device that is associated with a particular master device. The requests may specify, for instance, an amount of usage requested (e.g., a quantity of voice call minutes, an amount of data, a quantity of SMS messages, etc.).

Temporary access module 320 may determine, based on information stored by sub-account device information module 305 and/or master device information module 310, whether to grant the request for temporary access. For example, as described above, temporary access module 320 may identify whether temporary access has been previously granted to the sub-account device or a user of the sub-account device, and to what extent temporary access has been previously granted. Additionally, or alternatively, temporary access module 320 may identify whether temporary access has been previously granted to sub-account devices via the master device, and to what extent temporary access has been previously granted via the master device.

Temporary access module 320 may determine whether the previous temporary access (if any) exceeds a threshold level of temporary access (e.g., based on thresholds that may be provided by, for example, an administrator). If the sub-account device has not been previously granted the threshold amount of temporary access, and/or if the master device has not been used to previously grant the threshold amount of temporary access, then temporary access module 320 may grant temporary access, based on an amount requested.

In some implementations, the thresholds may be different for sub-account devices and master devices. For example, the threshold amount of access for sub-account devices may be 80 minutes of voice talk time, while the threshold amount of access for master devices may be 600 minutes of voice talk time. In this example, temporary access may be denied for a sub-account device that has been used for more than 80 minutes of voice talk time during previous temporary access, while temporary access may be denied for a sub-account device that is attempting to obtain temporary access via a master account through which sub-account devices have previously received temporary access, and have used more than 600 minutes of voice talk time during the previous temporary access.

Additionally, or alternatively, temporary access module 320 may determine whether the requested usage is supported by an amount of usage available for the master device. For instance, as mentioned above, temporary access module 320 may determine whether a subscription or contract, associated with the master device, is associated with at least the amount of requested usage. In some implementations, temporary access module 320 may determine whether a subscription or contract, associated with the master device, is associated with at least the amount of requested usage, plus at least a threshold amount of additional usage (e.g., whether enough usage would be left over for the reasonable use of the master device).

When determining whether to grant temporary access, temporary access module 320 may analyze security information associated with the requesting sub-account device and/or the master device. For instance, based on security information stored by sub-account device information module 305 and/or master device information module 310, temporary access module 320 may determine whether the sub-account device and/or the master device have been reported lost or stolen. If either the sub-account device or the master device have been reported lost or stolen, temporary access module 320 may deny a request for temporary access.

Further, when granting the temporary access, temporary access module 320 may provide temporary credentials to the sub-account device (e.g., temporary credentials stored by temporary credentials module 315). Temporary access module 320 may, when granting temporary access, notify the sub-account device, the master device, and/or the wireless network that temporary access has been granted.

Temporary access module 320 may receive usage information, associated with a sub-account device, from the sub-account device and/or a wireless network to which the sub-account device has received temporary access. Based on the usage information, and/or other factors (e.g., elapsed time since temporary access has been granted to the sub-account device), temporary access module 320 may revoke temporary access. For example, when the sub-account device has used the number of voice call minutes granted with the temporary access, temporary access module 320 may determine that the temporary access should be revoked. Temporary access module 320 may notify the sub-account device, the master device, and/or the wireless network that the temporary access has been revoked. Upon revocation, the sub-account device may no longer be able to access the wireless network. In some implementations, temporary access module 320 place make the temporary credentials available for use for other sub-account devices (e.g., may place a telephone number back into a "pool" of available telephone numbers).

When revoking temporary access, temporary access module 320 may provide an offer for alternate access to a sub-account device. For example, temporary access module 320 may provide an offer to renew the temporary access at the same or a different rate than was previously offered. For instance, assume that temporary access was previously offered at 10 cents per minute of voice call time. Upon expiration of the temporary access, temporary access module 320 may offer renewal at 20 cents per minute of voice call time. Additionally, or alternatively, temporary access module 320 may offer an annual, multi-year, or month-to-month contract to the sub-account device. Under the offered contract, the sub-account device may no longer be tied to the master device. That is, once the sub-account device accepts the offered contract, the sub-account device may no longer be a "sub-account device," in that the usage by the sub-account device no longer may count against the allowed usage associated with the master device. Further, once the sub-account device accepts the offered contract, the master device may no longer have control over usage of the sub-account device (e.g., the master device may not be able to monitor the usage of the sub-account device and/or may not be able to revoke the access of the sub-account device to the wireless network).

Figure 4:
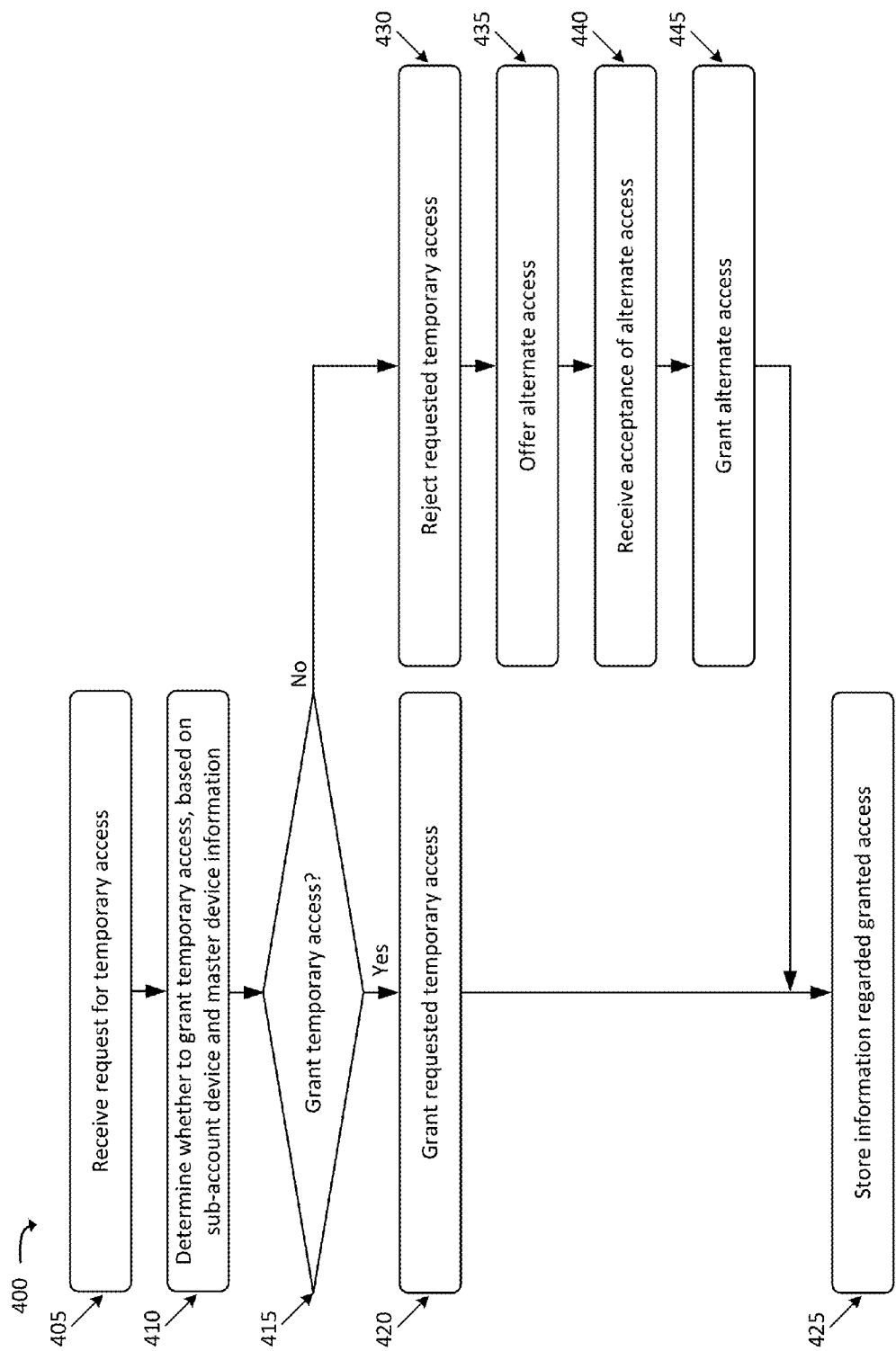
FIG. 4 illustrates an example process for granting temporary access to a wireless network.

FIG. 4 illustrates an example process 400 for granting temporary access to a wireless network. In one example implementation, process 400 may be performed by temporary access server 250. In other implementations, some or all of process 400 may be performed by one or more other devices in lieu of, or in conjunction with, temporary access server 250.

Process 400 may include receiving a request for temporary access (block 405). For example, temporary access server 250 may receive a request for temporary access to a wireless network by sub-account device 205. The request may be received from sub-account device 205, from master device 210, and/or through another interface, such as a web interface associated with an account of master device 210. The request may, in some implementations, specify an amount of usage requested (e.g., a quantity of voice call minutes, a quantity of SMS messages, an amount of data, etc.). The request may also include information identifying sub-account device 205 and/or master device 210 (e.g., an IMEI, IMSI, MAC, or the like). The request may additionally, or alternatively, include information identifying a user associated with sub-account device 205 and/or master device 210 (e.g., a name of the user).

Process 400 may also include determining whether to grant temporary access, based on sub-account device information and master device information (block 410). For example, as described above with respect to temporary access module 320, temporary access server 250 may determine whether sub-account device 205 has previously received a threshold amount of temporary access to the wireless network, and/or whether master device 210 has been used to provide a threshold amount of temporary access to the wireless network. As also described above, temporary access server 250 may determine whether sub-account device 205 and/or master device 210 have been reported as lost or stolen. As additionally described above, temporary access server 250 may determine whether a subscription or contract, associated with master device 210, is able to support the amount of usage requested for sub-account device 205.

If temporary access should be granted (block 415—YES), then process 400 may include granting the requested temporary access (block 420). For example, temporary access server 250 may determine that the requested temporary access should be granted to sub-account device 205. Temporary access server 250 may notify sub-account device 205, master device 210, and/or one or more components of a wireless network (e.g., HSS/AAA server 235) that temporary access has been granted to sub-account device 205. Temporary access server 250 may, in some implementations, notify sub-account device 205, master device 210, and/or one or more components of the wireless network regarding temporary credentials that have been granted to sub-account device 205, such as a telephone number.

Process 400 may further include storing information regarding the granted access (block 425). For example, temporary access server 250 may store information indicating that temporary access has been granted to sub-account device 205. The information may indicate, for example, how much access has been granted (e.g., a quantity of minutes of voice call time, a quantity of SMS messages, an amount of data, a length of time for which access has been granted, etc.). This information may be used, for example, when subsequent requests are made for temporary access.

If, on the other hand, temporary access should not be granted (block 415—NO), then process 400 may include rejecting the requested temporary access (block 430). For example, temporary access server 250 may reject the requested temporary access when sub-account device 205 and/or master device 210 are associated with excessive temporary access to the wireless network, when sub-account device 205 and/or master device 210 are lost or stolen, when master device 210 is not associated with sufficient available usage to support the requested temporary access, etc. Temporary access server 250 may notify sub-account device 205 and/or master device 210 that the requested access has been rejected.

Process 400 may further include offering alternate access (block 435). For example, temporary access server 250 may offer a standalone subscription to sub-account device 205 (e.g., a subscription for service that does is not tied to a subscription associated with master device 210). As another example, temporary access server 250 may offer temporary access that is different from the access requested. For instance, the offered alternate temporary access may have fewer voice call minutes, fewer SMS messages, less data, and/or may be charged at a higher rate than the original requested temporary access. The alternate access may be determined based on usage patterns associated with sub-account device 205 and/or master device 210, based on the original request for temporary access (received at block 405), and/or based on one or more other factors. In some implementations, the alternate access may be determined automatically or based on input provided by an administrator.

Process 400 may also include receiving acceptance of the alternate access (block 440). For example, temporary access server 250 may receive a message from sub-account device 205 and/or master device 210, indicating that the offered alternate access has been accepted.

Process 400 may additionally include granting the alternate access (block 445). For example, temporary access server 250 may notify sub-account device 205, master device 210, and/or one or more components of a wireless network (e.g., HSS/AAA server 235) that the alternate access has been granted to sub-account device 205. Temporary access server 250 may, in some implementations, notify sub-account device 205, master device 210, and/or one or more components of the wireless network regarding credentials that have been granted to sub-account device 205, such as a telephone number.

Process 400 may further include storing information regarding the granted access (block 425). For example, temporary access server 250 may store information indicating that the alternate access has been granted to sub-account device 205. The information may indicate, for example, how much access has been granted (e.g., a quantity of minutes of voice call time, a quantity of SMS messages, an amount of data, a length of time for which access has been granted, etc.). This information may be used, for example, when subsequent requests are made for temporary access.

Figure 5:
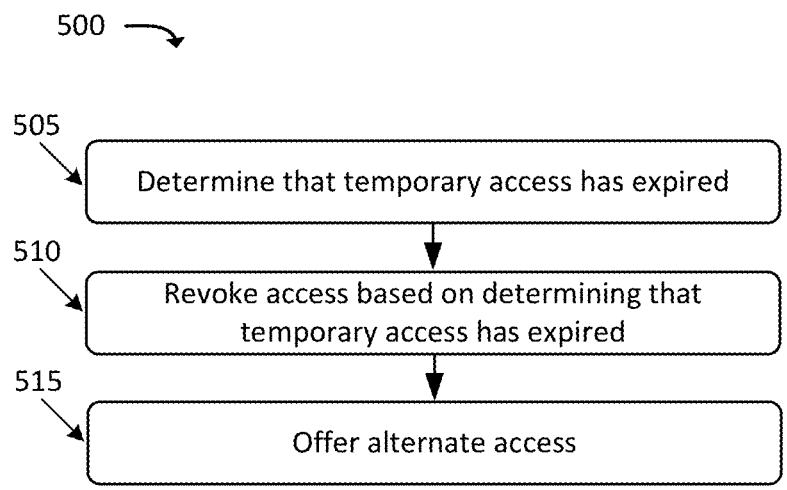
FIG. 5 illustrates an example process for revoking access to a wireless network upon the expiration of temporary access.

FIG. 5 illustrates an example process 500 for revoking access to a wireless network upon the expiration of temporary access. In one example implementation, process 500 may be performed by temporary access server 250. In other implementations, some or all of process 500 may be performed by one or more other devices in lieu of, or in conjunction with, temporary access server 250.

Process 500 may include determining that temporary access has expired (block 505). For example, as described above with respect to temporary access module 320, temporary access server 250 may determine that temporary access to a wireless network, granted to a particular sub-account device 205, has expired when a granted amount of usage has been consumed. For example, if an allotted quantity of voice call minutes, quantity of SMS messages, amount of data, etc., has been used by sub-account device 205, temporary access server 250 may determine that the temporary access associated with sub-account device 205 has expired.

Process 500 may further include revoking the access based on determining that the temporary access has expired (block 510). For example, temporary access server 250 may notify sub-account device 205, master device 210, and/or one or more components of the wireless network (e.g., HSS/AAA server 235) that the temporary access to the wireless network has been revoked.

Process 500 may also include offering alternate access (block 515). For example, as similarly described above with respect to block 435 of FIG. 4, temporary access server 250 may offer alternate access upon expiration of the temporary access. For example, temporary access server 250 may offer a standalone subscription and/or a renewal of the temporary access (e.g., at a more expensive rate).

Figure 6:
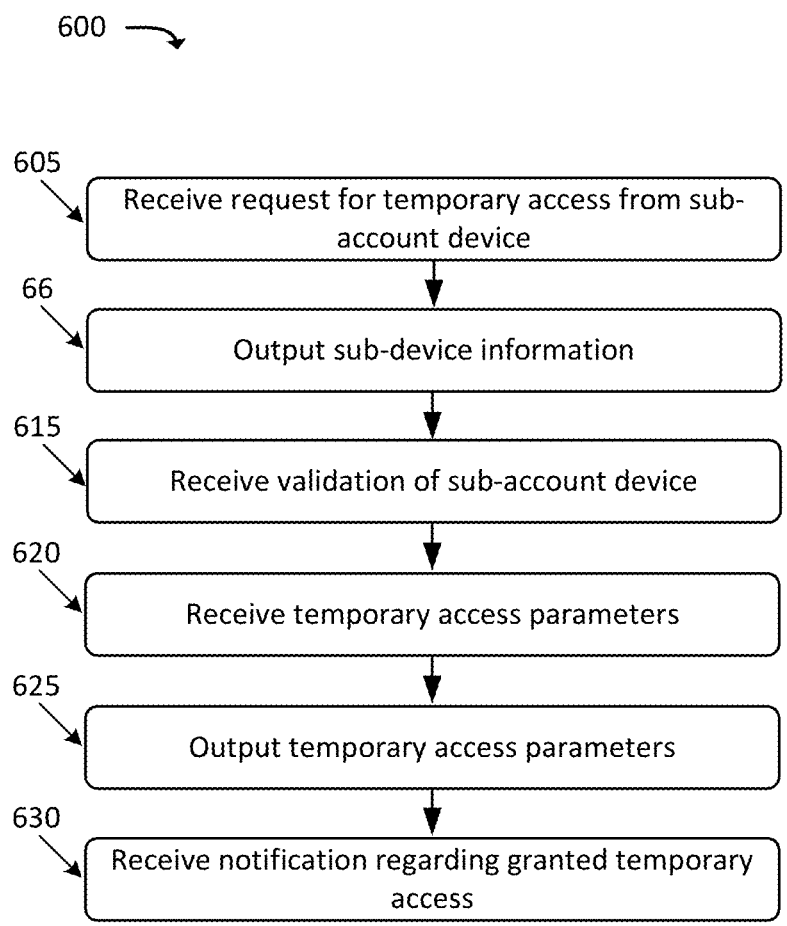
FIG. 6 illustrates an example process for obtaining temporary wireless access, at a master device, for a sub-account device.

FIG. 6 illustrates an example process 600 for obtaining temporary wireless access. In one example implementation, process 600 may be performed by master device 210. In other implementations, some or all of process 600 may be performed by one or more other devices in lieu of, or in addition to, master device 210. For example, in some implementations, portions of process 600 may be performed by sub-account device 205.

Process 600 may include receiving a request for temporary access from a sub-account device (block 605). For example, master device 210 may receive a request, from sub-account device 205, for access to a wireless network. Sub-account device 205 and master device 210 may communicate over a personal area network ("PAN"). For example, sub-account device 205 and master device 210 may communicate via a wireless LAN ("WLAN"), Bluetooth®, NFC, or another communication technique. The request may include information regarding sub-account device 205, such as an IMEI, an IMSI, a MAC, an identity of a user associated with sub-account device 205, and/or another identifier associated with sub-account device 205.

Process 600 may also include outputting information regarding the sub-account device (block 610). For example, master device 210 may output the IMEI, IMSI, etc., associated with sub-account device 205, to temporary access server 250. The outputted information may be used by temporary access server 250 to verify whether temporary access may be granted to sub-account device 205. For instance, as described above, temporary access server 250 may determine whether sub-account device 205 has been reported as lost or stolen.

Process 600 may further include receiving validation of the sub-account device (block 615). For example, master device 210 may receive an indication, from temporary access server 250, that sub-account device 205 is authorized to receive temporary access to the wireless network.

Process 600 may additionally include receiving temporary access parameters (block 620). Based on receiving the validation (at block 615), master device 210 may receive parameters regarding the requested temporary access. For example, the parameters may indicate a requested quantity of voice call minutes, a requested quantity of SMS messages, a requested amount of data, etc. The parameters may be received from sub-account device 205, a user of sub-account device 205, a user of master device 210, and/or from another source.

Process 600 may also include outputting the temporary access parameters (block 625). For example, master device 210 may output the temporary access parameters (received at block 620) to temporary access server 250. In some implementations, in lieu of blocks 620 and 625 being performed by master device 210, sub-account device 205 may output the temporary access parameters to temporary access server 250.

Process 600 may further include receiving a notification regarding the granted temporary access (block 630). For instance, master device 210 may receive a notification from temporary access server 250, indicating the temporary access has been granted to sub-account device 205. In some implementations, sub-account device 205 may additionally, or alternatively, receive the notification indicating that the temporary access has been granted. Once the temporary access has been granted, sub-account device 205 may access the wireless network.

Figure 7:
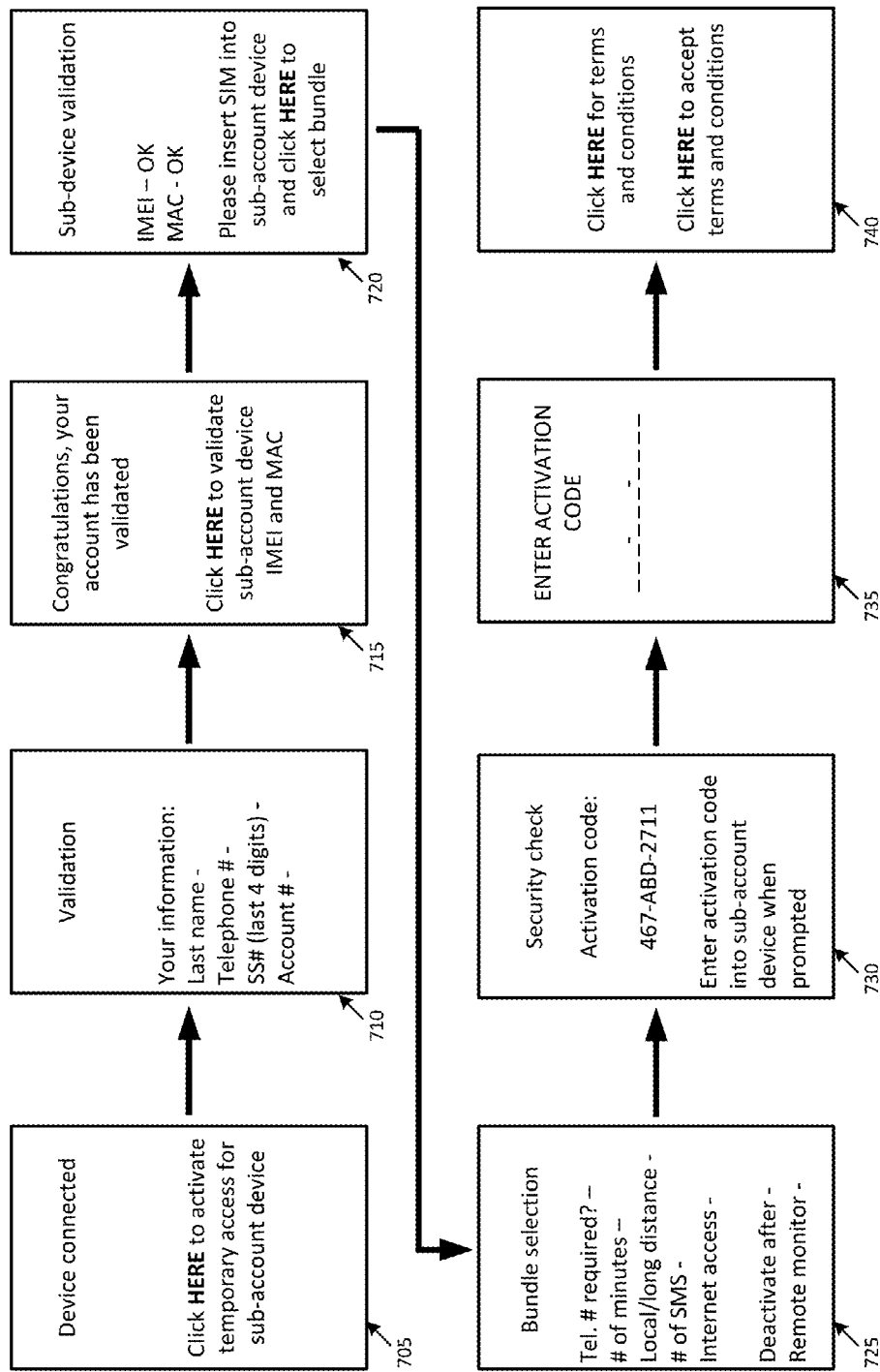
FIG. 7 illustrates example user interfaces that correspond to obtaining temporary wireless access, in accordance with some implementations.

FIG. 7 illustrates example user interfaces 705-740, which may be displayed by sub-account device 205 and/or master device 210. User interfaces 705-740 may correspond to a request for temporary access, made by master device 210 on behalf of sub-account device 205. In some implementations user interfaces 705-730 and 740 may be presented by master device 210, and user interface 735 may be presented by sub-account device 205. In other implementations, one or more of user interfaces 705-740 may be presented by one or more other devices.

User interface 705 may be presented by sub-account device 205 to indicate that master device 210 is in communication with sub-account device 205, and may include an option ("Click HERE") to request temporary access for sub-account device 205. User interface 710 may be presented by sub-account device 205 in response to the selection of the option to request temporary access for sub-account device 205. User interface 710 may include fields for a user of master device 210 to provide information regarding the user (e.g., a last name of the user, a telephone number of the user, the last four digits of the user's social security number, an account number associated with the user's account, etc.). This information may be used by temporary access server 250 to identify information associated with master device 210 (e.g., information stored by master device information module 310), which may be used to validate requests for temporary access made through master device 210, as described above.

User interface 715 may be presented when master device 210 has been validated by temporary access server 250. As shown, user interface 715 may include an option ("Click HERE") to validate sub-account device 205. As described above, sub-account device 205 may be validated by temporary access server 250 to verify whether temporary access to the wireless network may be granted to sub-account device 205. For instance, temporary access server 250 may determine whether sub-account device 205 has been reported as lost or stolen.

User interface 720 may be presented based on receiving an indication from temporary access server 250 that sub-account device 205 has been validated. User interface 720 may notify a user of sub-account device 205 and/or master device 210 that a subscriber identity module ("SIM") card should be inserted into sub-account device 205, and may present an option ("Click HERE") to select temporary access parameters.

User interface 725 may be presented based on a selection of the option to select the temporary access parameters. User interface 725 may allow a user to provide requested parameters of temporary access, such as whether a telephone number is required, a requested quantity of voice call minutes, a request for local and/or long distance call access, a quantity of SMS messages, and a requested amount of data. The parameters may also include a length of time for which the temporary access is requested ("Deactivate after"), and whether additional services are requested, such as remote monitoring (e.g., a service whereby master device 210 may monitor the usage of sub-account device 205). The parameters may be provided to temporary access server 250, as described above. Temporary access server 250 may determine whether the parameters are acceptable (e.g., whether a subscription, associated with master device 210, is able to support the requested parameters).

User interface 730 may be presented by master device 210 when temporary access server 250 has indicated that the parameters are acceptable. User interface 730 may notify a user of sub-account device 205 and/or master device 210 of a security code that should be inputted into sub-account device 205. The security code may be used to ensure that sub-account device 205 and master device 210 are being used by users who are in close physical proximity to each other and/or are otherwise in communication with each other.

User interface 735 may be presented by sub-account device 205 when temporary access server 250 has indicated that the parameters are acceptable. For example, user interface 735 may be presented as a pop-up, an SMS message, an e-mail, or the like. User interface 735 may allow a user to provide the security code, indicated in user interface 730. User interface 740 may be presented by sub-account device 205 and/or master device 210, to indicate that temporary access has been granted to sub-account device 205. User interface 730 may include options to view and/or accept terms and conditions of the temporary access. In some implementations, temporary access may not be granted until the terms and conditions have been accepted. While FIG. 7 illustrates example user interfaces 705-740 that may be presented by user interface 705 and/or user interface 710, in practice, different, additional, fewer, or differently arranged user interfaces may be presented.

Figure 8:
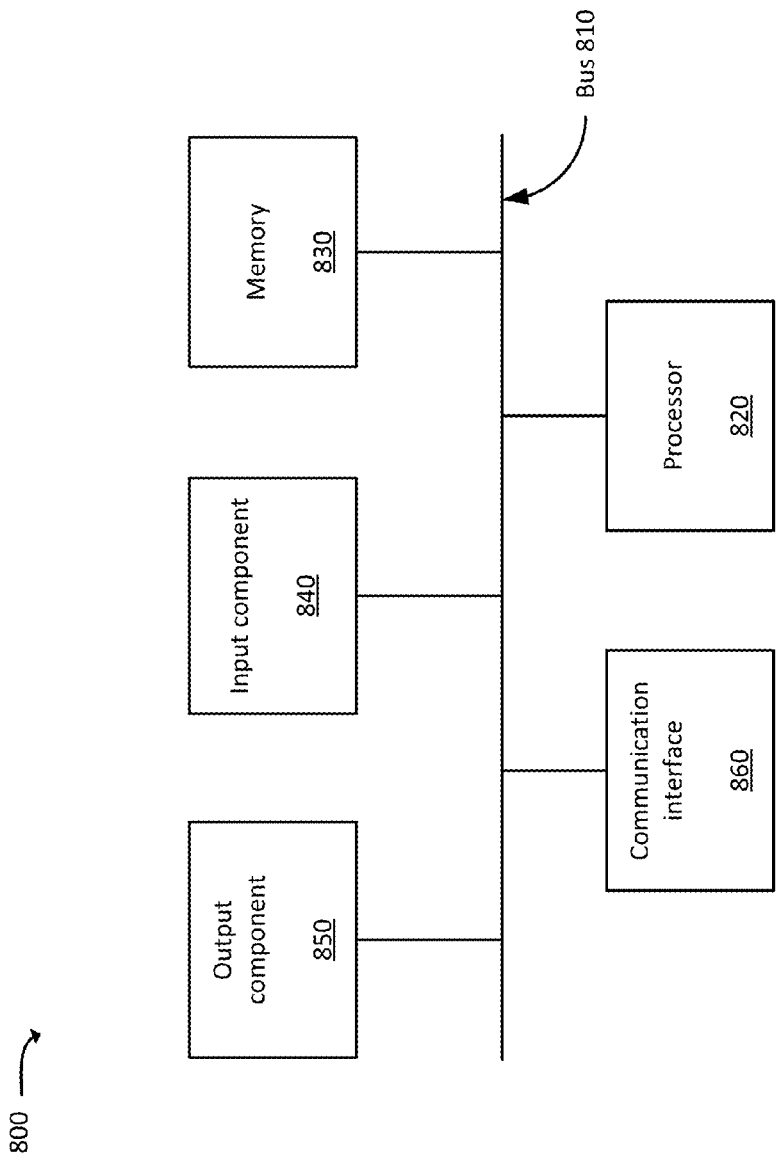
FIG. 8 illustrates example components of one or more devices, according to one or more implementations described herein.

FIG. 8 is a diagram of example components of device 800. One or more of the devices described above (e.g., as described with respect to FIGS. 1A, 1B, 2, and 3) may include one or more devices 800. Device 800 may include bus 810, processor 810, memory 820, input component 830, output component 840, and communication interface 860. In another implementation, device 800 may include additional, fewer, different, or differently arranged components.

Bus 810 may include one or more communication paths that permit communication among the components of device 800. Processor 810 may include a processor, microprocessor, or processing logic that may interpret and execute instructions. Memory 820 may include any type of dynamic storage device that may store information and instructions for execution by processor 810, and/or any type of non-volatile storage device that may store information for use by processor 810.

Input component 830 may include a mechanism that permits an operator to input information to device 800, such as a keyboard, a keypad, a button, a switch, etc. Output component 840 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 810 executing software instructions stored in a computer-readable medium, such as memory 820. A computer-readable medium may be defined as a non-transitory memory device. A memory device may include space within a single physical memory device or spread across multiple physical memory devices. The software instructions may be read into memory 820 from another computer-readable medium or from another device. The software instructions stored in memory 820 may cause processor 810 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4-6, the order of the blocks may be modified in other implementations. Further, non-dependent blocks may be performed in parallel.

Furthermore, the above description was presented in the context of broadcasting programming content. In some implementations, similar techniques may be used for programming content that is multicasted (e.g., delivered to multiple recipients without using a broadcasting technique), or delivered in another fashion. Additionally, while the above description describes examples in which targeted advertising is presented contemporaneously, or interspersed with, programming content; in some implementations, targeted advertising may be presented at different times with respect to programming content. For example, in some implementations, targeted advertising may be presented after the presentation of programming content (e.g., immediately after the presentation of programming content, one minute after the presentation of programming content, one week after the presentation of programming content, etc.).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1A, 1B, 2, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
receiving, by a server device, a request for temporary access to a wireless network, the request being associated with a first device, wherein the temporary access is associated with a sub-account of an account that is based on a subscription for access to the wireless network, the subscription being associated with a second device,
  wherein usage, of the wireless network, by the first device under the sub-account, is counted against an amount of usage allotted to the subscription associated with the second device;
identifying, by the server device, at least one of:
  first prior usage information associated with the first device, the first prior usage information indicating an extent to which temporary access was previously granted to the first device, under the sub-account,
    the extent to which temporary access was previously granted to the first device indicating at least a quantity of times that temporary access was previously granted to the first device, under the sub-account, or
  second prior usage information associated with the second device, the second prior usage information indicating an extent to which temporary access was previously granted, under the sub-account, to one or more devices associated with the second device,
    the extent to which temporary access was previously granted to the one or more devices indicating at least a quantity of times that temporary access was previously granted to the one or more devices, under the sub-account;
determining, by the server device and based on the identified first prior usage information or the identified second prior usage information, whether to grant the request for temporary access to the wireless network, the determining being based on one or more thresholds that are associated with excessive previous temporary access under the sub-account;
granting, by the server device, the request for temporary access when the determination, based on the first or the second prior usage information and the one or more thresholds, indicates at least one of:
  that the quantity of times, that temporary access was previously granted to the first device, under the sub-account, does not exceed a first threshold, of the one or more thresholds, or
  that the quantity of times, that temporary access was previously granted to the one or more devices, under the sub-account, does not exceed a second threshold, of the one or more thresholds; and
rejecting, by the server device, the request for temporary access when the determination, based on the first or the second prior usage information and the one or more thresholds, indicates at least one of:
  that the quantity of times, that temporary access was previously granted to the first device, under the sub-account, exceeds the first threshold, or
  that the quantity of times, that temporary access was previously granted to the one or more devices, under the sub-account, exceeds the second threshold.

2. The method of claim 1, wherein the one or more thresholds further include:
a threshold quantity of voice call minutes previously granted to the first device, under the sub-account,
a threshold quantity of voice call minutes used by the first device during a period of time in which the first device was granted temporary access to the wireless network, under the sub-account,
a threshold amount of data previously granted to the first device, under the sub-account,
a threshold amount of data used by the first device during a period of time in which the first device was granted temporary access to the wireless network, under the sub-account,
a threshold length of time during which the first device was granted temporary access to the wireless network, under the sub-account,
a threshold quantity of messages previously granted to the first device, under the sub-account, or
a threshold quantity of messages sent or received by the first device during a period of time in which the first device was granted temporary access to the wireless network, under the sub-account.

3. The method of claim 1, wherein the one or more thresholds include:
a threshold quantity of voice call minutes previously granted to the one or more devices associated with the second device, under the sub-account,
a threshold quantity of voice call minutes used by the one or more devices, associated with the second device, during a period of time in which the one or more devices were granted temporary access to the wireless network, under the sub-account,
a threshold amount of data previously granted to the one or more devices associated with the second device, under the sub-account,
a threshold amount of data used by the one or more devices, associated with the second device, during a period of time in which the one or more devices were granted temporary access to the wireless network, under the sub-account,
a threshold length of time during which the one or more devices, associated with the second device, were granted temporary access to the wireless network, under the sub-account,
a threshold quantity of messages previously granted to the one or more devices associated with the second device, under the sub-account, or
a threshold quantity of messages sent or received by the one or more devices, associated with the second device, during a period of time in which the one or more devices were granted temporary access to the wireless network, under the sub-account.

4. The method of claim 1, wherein the determining further comprises at least one of:
determining whether the first device has been reported lost or stolen,
wherein the request for temporary access is rejected when the first device has been lost or stolen.

5. The method of claim 1, wherein the request indicates a requested amount of usage for the temporary access, the method further comprising:
identifying an amount of available usage associated with the subscription associated with the second device; and
comparing the amount of available usage to the requested amount of usage,
wherein the determining, whether to grant the request for temporary access to the wireless network, is further based on the comparing.

6. The method of claim 1, wherein when the request for temporary access is granted, the method further comprises:
subsequently determining that the temporary access, under the sub-account, has expired;
revoking the temporary access, based on determining that the temporary access has expired;
receiving, after the temporary access has expired, a subsequent request for temporary access under the sub-account; and
denying the subsequent request for temporary access, based on determining that the temporary access has been previously granted to the first device, under the sub-account.

7. The method of claim 6, further comprising:
offering a standalone subscription to the first device, based on determining that the temporary access has expired.

8. The method of claim 7, wherein usage by the first device, under the offered standalone subscription, is not counted against the subscription associated with the second device.

9. A server device, comprising:
a non-transitory memory device storing a set of processor-executable instructions; and
a processor configured to execute the processor-executable instructions, wherein executing the processor-executable instructions causes the processor to:
identify a received request for temporary access to a wireless network, the request being associated with a first device, wherein the temporary access is associated with a sub-account of an account that is based on a subscription for access to the wireless network, the subscription being associated with a second device,
wherein usage, of the wireless network, by the first device under the sub-account, is counted against an amount of usage allotted to the subscription associated with the second device;
identify at least one of:
first prior usage information associated with the first device, the first prior usage information indicating an extent to which temporary access was previously granted to the first device, under the sub-account,
the extent to which temporary access was previously granted to the first device indicating at least a quantity of times that temporary access was previously granted to the first device, under the sub-account, or
second prior usage information associated with the second device, the second prior usage information indicating an extent to which temporary access was previously granted, under the sub-account, to one or more devices associated with the second device,
the extent to which temporary access was previously granted to the one or more devices indicating at least a quantity of times that temporary access was previously granted to the one or more devices, under the sub-account;
determine, based on the identified first prior usage information or the identified second prior usage information, whether to grant the request for temporary access to the wireless network, the determining being further based on one or more thresholds that are associated with excessive previous temporary access under the sub-account;
grant the request for temporary access when the determination, based on the first or the second prior usage information and the one or more thresholds, indicates at least one of:
that the quantity of times, that temporary access was previously granted to the first device, under the sub-account, does not exceed a first threshold, of the one or more thresholds, or
that the quantity of times, that temporary access was previously granted to the one or more devices, under the sub-account, does not exceed a second threshold, of the one or more thresholds; and
reject the request for temporary access when the determination, based on the first or the second prior usage information and the one or more thresholds, indicates at least one of:
that the quantity of times, that temporary access was previously granted to the first device, under the sub-account, exceeds the first threshold, or
that the quantity of times, that temporary access was previously granted to the one or more devices, under the sub-account, exceeds the second threshold.

10. The server device of claim 9, wherein the one or more thresholds include:
- a threshold quantity of voice call minutes previously granted to the first device, under the sub-account,
- a threshold quantity of voice call minutes used by the first device during a period of time in which the first device was granted temporary access to the wireless network, under the sub-account,
- a threshold amount of data previously granted to the first device, under the sub-account,
- a threshold amount of data used by the first device during a period of time in which the first device was granted temporary access to the wireless network, under the sub-account,
- a threshold length of time during which the first device was granted temporary access to the wireless network, under the sub-account,
- a threshold quantity of messages previously granted to the first device, under the sub-account, or
- a threshold quantity of messages sent or received by the first device during a period of time in which the first device was granted temporary access to the wireless network, under the sub-account.

11. The server device of claim 9, wherein the one or more thresholds include:
- a threshold quantity of voice call minutes previously granted to the one or more other devices associated with the second device, under the sub-account,
- a threshold quantity of voice call minutes used by the one or more other devices during a period of time in which the one or more devices were granted temporary access to the wireless network, under the sub-account,
- a threshold amount of data previously granted to the one or more other devices, under the sub-account,
- a threshold amount of data used by the one or more other devices during a period of time in which the one or more devices were granted temporary access to the wireless network, under the sub-account,
- a threshold length of time during which the one or more other devices were granted temporary access to the wireless network, under the sub-account,
- a threshold quantity of messages previously granted to the one or more other devices, under the sub-account, or
- a threshold quantity of messages sent or received by the one or more other devices during a period of time in which the one or more devices were granted temporary access to the wireless network, under the sub-account.

12. The server device of claim 9, wherein executing the processor-executable instructions, to determine whether to grant the request for temporary access to the wireless network, further causes the processor to:
- determine whether the first device has been reported lost or stolen,
- wherein the request for temporary access is rejected when the first device has been lost or stolen.

13. The server device of claim 9, wherein the request indicates a requested amount of usage for the temporary access, wherein executing the processor-executable instructions further causes the processor to:
- identify an amount of available usage associated with the subscription associated with the second device; and
- compare the amount of available usage to the requested amount of usage,
- wherein the determining, whether to grant the request for temporary access to the wireless network, is further based on the comparing.

14. The server device of claim 9, wherein when the request for temporary access is granted, the processor is further to:
- subsequently determine that the temporary access, under the sub-account, has expired;
- revoke the temporary access, based on determining that the temporary access has expired;
- receive, after the temporary access has expired, a subsequent request for temporary access under the sub-account; and
- deny the subsequent request for temporary access, based on determining that the temporary access has been previously granted to the first device, under the sub-account.

15. The server device of claim 14, wherein when the request for temporary access is granted, the processor is further to:
- offer a standalone subscription to the first device, based on determining that the temporary access has been previously granted to the first device, under the sub-account.

16. The server device of claim 15, wherein usage by the first device, under the offered standalone subscription, is not counted against the subscription associated with the second device.

17. A non-transitory computer-readable medium, storing a set of processor-executable instructions, which, when executed by a processor, cause the processor to:
- identify a received request for temporary access to a wireless network, the request being associated with a first device, wherein the temporary access is associated with a sub-account of an account that is based on a subscription for access to the wireless network, the subscription being associated with a second device,
  - wherein usage, of the wireless network, by the first device under the sub-account, is counted against an amount of usage allotted to the subscription associated with the second device;
- identify at least one of:
  - first prior usage information associated with the first device, the first prior usage information indicating an extent to which temporary access was previously granted to the first device, under the sub-account,
    - the extent to which temporary access was previously granted to the first device indicating at least a quantity of times that temporary access was previously granted to the first device, under the sub-account, or
  - second prior usage information associated with the second device, the second prior usage information indicating an extent to which temporary access was previously granted, under the sub-account, to one or more devices associated with the second device,
    - the extent to which temporary access was previously granted to the one or more devices indicating at least a quantity of times that temporary access was previously granted to the one or more devices, under the sub-account;
- determine, based on the identified first prior usage information or the identified second prior usage information, whether to grant the request for temporary access to the wireless network, the determining being further based on one or more thresholds that are associated with excessive previous temporary access under the sub-account;
- grant the request for temporary access when the determination, based on the first or the second prior usage information and the one or more thresholds, indicates at least one of:

that the quantity of times, that temporary access was previously granted to the first device, under the sub-account, does not exceed a first threshold, of the one or more thresholds, or that the quantity of times, that temporary access was previously granted to the one or more devices, under the sub-account, does not exceed a second threshold, of the one or more thresholds; and reject the request for temporary access when the determination, based on the first or the second prior usage information and the one or more thresholds, indicates at least one of:

that the quantity of times, that temporary access was previously granted to the first device, under the sub-account, exceeds the first threshold, or that the quantity of times, that temporary access was previously granted to the one or more devices, under the sub-account, exceeds the second threshold.

18. The non-transitory computer-readable medium of claim 17, wherein the one or more thresholds include:
a threshold quantity of voice call minutes previously granted to the first device, under the sub-account,
a threshold quantity of voice call minutes used by the first device during a period of time in which the first device was granted temporary access to the wireless network, under the sub-account,
a threshold amount of data previously granted to the first device, under the sub-account,
a threshold amount of data used by the first device during a period of time in which the first device was granted temporary access to the wireless network, under the sub-account,
a threshold length of time during which the first device was granted temporary access to the wireless network, under the sub-account,
a threshold quantity of messages previously granted to the first device, under the sub-account, or
a threshold quantity of messages sent or received by the first device during a period of time in which the first device was granted temporary access to the wireless network, under the sub-account.

19. The non-transitory computer-readable medium of claim 17, wherein the one or more thresholds include:
a threshold quantity of voice call minutes previously granted to the one or more other devices associated with the second device, under the sub-account,
a threshold quantity of voice call minutes used by the one or more other devices during a period of time in which the one or more devices were granted temporary access to the wireless network, under the sub-account,
a threshold amount of data previously granted to the one or more other devices, under the sub-account,
a threshold amount of data used by the one or more other devices during a period of time in which the one or more devices were granted temporary access to the wireless network, under the sub-account,
a threshold length of time during which the one or more other devices were granted temporary access to the wireless network, under the sub-account,
a threshold quantity of messages previously granted to the one or more other devices, under the sub-account, or
a threshold quantity of messages sent or received by the one or more other devices during a period of time in which the one or more devices were granted temporary access to the wireless network, under the sub-account.

20. The non-transitory computer-readable medium of claim 17, wherein the processor-executable instructions, to determine whether to grant the request for temporary access to the wireless network, further comprise instructions to:
determine whether the first device has been reported lost or stolen,
wherein the request for temporary access is rejected when the first device has been lost or stolen.

* * * * *